(12) United States Patent
Boyer et al.

(10) Patent No.: US 7,130,139 B1
(45) Date of Patent: *Oct. 31, 2006

(54) WRITE VELOCITY IDENTIFICATION

(75) Inventors: Keith Gary Boyer, Broomfield, CO (US); Richard Allen Gill, Arvada, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/176,035

(22) Filed: Jul. 7, 2005

Related U.S. Application Data

(63) Continuation of application No. 10/862,586, filed on Jun. 7, 2004, now Pat. No. 6,956,709.

(51) Int. Cl.
*G11B 5/09* (2006.01)
*G11B 15/46* (2006.01)

(52) U.S. Cl. .................. 360/46; 360/25; 360/73.01; 360/73.11; 360/73.14

(58) Field of Classification Search .............. None
See application file for complete search history.

(56) References Cited

U.S. PATENT DOCUMENTS

| | | | |
|---|---|---|---|
| 3,835,374 A * | 9/1974 | Frost | 324/220 |
| 5,189,572 A * | 2/1993 | Gooch | 360/77.12 |
| 5,319,499 A * | 6/1994 | Kim et al. | 386/72 |
| 5,539,588 A * | 7/1996 | Sawaguchi et al. | 360/46 |
| 5,757,855 A * | 5/1998 | Strolle et al. | 375/262 |
| 5,764,431 A | 6/1998 | Gill | |
| 5,986,835 A * | 11/1999 | Tanaka et al. | 360/53 |
| 6,134,072 A * | 10/2000 | Zweighaft | 360/77.13 |
| 6,163,421 A * | 12/2000 | Shinpuku et al. | 360/46 |
| 6,282,042 B1 * | 8/2001 | Hana et al. | 360/64 |
| 6,343,336 B1 * | 1/2002 | Norton et al. | 710/65 |
| 6,433,945 B1 * | 8/2002 | Norton, Jr. | 360/46 |
| 6,441,985 B1 * | 8/2002 | Gill | 360/73.04 |
| 6,462,904 B1 | 10/2002 | Albrecht et al. | |
| 6,580,768 B1 | 6/2003 | Jaquette | |
| 6,813,108 B1 * | 11/2004 | Annampedu et al. | 360/51 |
| 6,839,196 B1 * | 1/2005 | Trivedi | 360/77.06 |
| 6,956,709 B1 * | 10/2005 | Boyer et al. | 360/46 |
| 7,006,317 B1 * | 2/2006 | Hennecken et al. | 360/65 |
| 2003/0001036 A1 | 1/2003 | Beavers et al. | |

* cited by examiner

*Primary Examiner*—Wayne Young
*Assistant Examiner*—Dismery Mercedes
(74) *Attorney, Agent, or Firm*—Brooks Kushman P.C.

(57) ABSTRACT

A drive and method of identifying write velocity during reading are provided. When a track is being read, the data signal is processed prior to determining the data stream to identify the velocity with which the track data were written. The read channel is adjusted based on the identified velocity to compensate for write channel transfer function variation.

18 Claims, 6 Drawing Sheets

WRITE VELOCITY IDENTIFICATION

CROSS-REFERENCE TO RELATED APPLICATIONS

This application is a continuation of U.S. application Ser. No. 10/862,586, filed Jun. 7, 2004 now U.S. Pat. No. 6,956,709.

BACKGROUND OF THE INVENTION

1. Field of the Invention

The present invention relates to data storage systems.

2. Background Art

In a traditional magnetic storage medium, a read circuit detects flux reversals to determine a data signal. Peak detection is used to interpret the information present in the data signal. As data areal density increases, the peaks get smaller and smaller relative to the background noise, and accordingly, get more and more difficult to detect. A technique used to allow further increases in data areal density that addresses difficulties associated with peak detection is partial response maximum likelihood (PRML).

PRML does not attempt to detect individual peaks in the way that the traditional peak detection techniques do. PRML uses digital signal processing to analyze the analog data signal from the read circuit to determine the most likely pattern of flux reversals. That is, PRML determines the most likely data stream based on the partial response observed in the analog data signal from the read circuit. PRML techniques have been quite successful in allowing the continued increase in areal data density for magnetic storage applications.

The use of tape drives and magnetic tapes to store data has become widespread. Tape drives have many advantages for certain storage applications in that they are able to meet the capacity, performance and reliability needs of these applications at an acceptable cost. PRML approaches have been used in tape drive applications.

Due to the increasing velocity ramp time of modern tape drive systems, it is becoming imperative that the velocity of the transport match the composite transfer rate of the computer host. This requirement leaves the tape system with the task of managing channel transfer function variation over the range of written velocity. Inherently, the transport is aware of the velocity with which it is reading, but is not aware of the velocity with which the data was previously written. Because the channel transfer function varies over the range of written velocity, to appropriately optimize the system, the read detection function must be able to change equalization prior to reading the data. A problem is the fact that it is difficult to appropriately optimize the system because it is difficult to determine the precise way that the equalization needs to be changed.

For the foregoing reasons, there is a need for a method of identifying the velocity with which the data was written that is reasonably immune to write channel transfer function variation.

SUMMARY OF THE INVENTION

It is an object of the invention is to provide a drive and a method that identify the velocity with which the data was written that is reasonably immune to write channel transfer function variation.

The invention comprehends a drive comprising a housing and a head. The housing receives a medium. The head reads and writes the tracks of the medium. Reading the tracks produces a data signal for each track. A plurality of channels process the data signals to determine the data stream for each data signal. The processing circuit is configured to, when the track is being read, process the data signal prior to determining the data stream to identify a velocity with which the track data were written. The channel is adjusted to compensate for write channel transfer function variation. The drive may be a tape drive with the medium being a magnetic tape. The channel may be a PRML equalization/detection channel. A lead-in code is one way to identify write velocity for track data. More detailed aspects of drives and methods comprehended by the invention are described below.

According to the invention in a particular implementation, a method is used to identify the velocity with which the data was written that is reasonably immune to write channel transfer function variation. In the method, when data is to be written to a tape, a lead-in code may be written to the tape prior to writing the data. When the previously written data is to be read from the tape, the lead-in code is read before the data is read. The lead-in code is processed to identify the velocity with which the data was written. In this way, because the lead-in code is read before the data is read, the read detection function is able to change equalization prior to reading the data based on the write velocity indicated by the lead-in code. Other velocity identification techniques could be used in the alternative.

The concept involved in this particular implementation is that (preferably every time) data is to be written to the tape, the appropriate lead-in code indicating tape write velocity is written prior to writing the data. During subsequent reading from the tape, the transport is aware of the velocity with which it is reading, and may determine the velocity with which the data was previously written from the lead-in code. The channel transfer function does vary over the range of written velocity. But the read detection function is able to change equalization prior to reading the data based on the identified velocity from the lead-in code.

According to the invention in this particular implementation, the lead-in code is reasonably immune to write channel transfer function variation. This is important because equalization may not be set correctly at the time the lead-in code is read. The lead-in code may take any suitable form that has the requisite reasonable immunity to transfer function variation.

DETAILED DESCRIPTION OF THE PREFERRED EMBODIMENT

Figure 1:
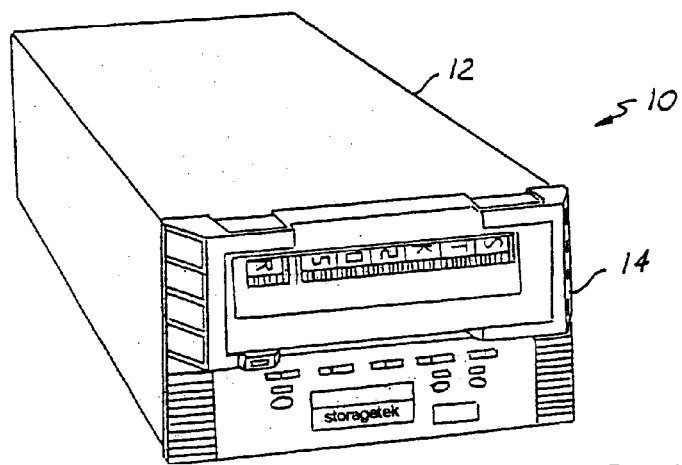
FIG. 1 is a tape drive made in accordance with the invention.

With reference to FIG. 1, a tape drive is generally indicated at 10. Tape drive 10 includes a housing 12. Housing 12 is for receiving a magnetic tape cartridge 14.

Magnetic tape cartridge 14 has multiple parallel tracks. The way that tape drive 10 reads and writes user data is best shown in FIG. 2.

Figure 2:
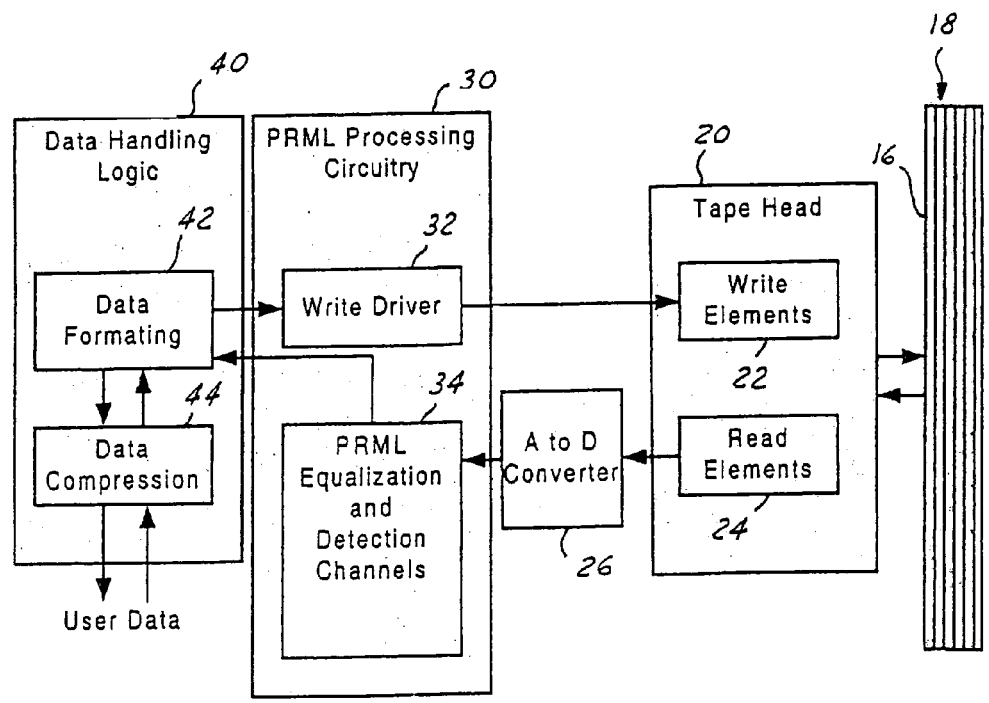
FIG. 2 is a block diagram illustrating the way that the tape drive reads and writes user data.

In FIG. 2, media 16 which is contained within magnetic tape cartridge 14 includes multiple parallel tracks 18. The number of parallel tracks that are simultaneously readable/writeable will vary depending on the application, as may various aspects of the tape drive 10 and tape cartridge 14. That is, the tape has hundreds of parallel tracks with a handful being written or read at one time in parallel.

Tape head 20 is for reading and writing the tracks 18 of media 16. Tape head 20 may take any suitable form. Writing is conducted with write elements 22, and reading is conducted with read elements 24. It is further appreciated that the read and write elements may take any suitable form. With continuing reference to FIG. 2, PRML processing circuitry 30 interfaces with the tape head components and provides appropriate PRML processing to decode the signals from the tape. An A-to-D converter 26 converts the analog read signal to a series of digital values for processing by circuitry 30.

PRML processing circuitry 30 includes write driver 32 and PRML equalization/detection channels 34. The PRML processing circuitry 30 addresses the fact that write channel transfer function variation makes it necessary to appropriately optimize the system by changing equalization prior to reading the data.

A method is used during reading to identify the velocity with which the data was written based on a lead-in code that is reasonably immune to write channel transfer function variation. In turn, PRML processing circuitry 30 changes the equalization of PRML equalization and detection channels 34 as appropriate prior to reading the actual data. The method may be implemented in any suitable way with an exemplary implementation being illustrated and described herein.

Figure 3:
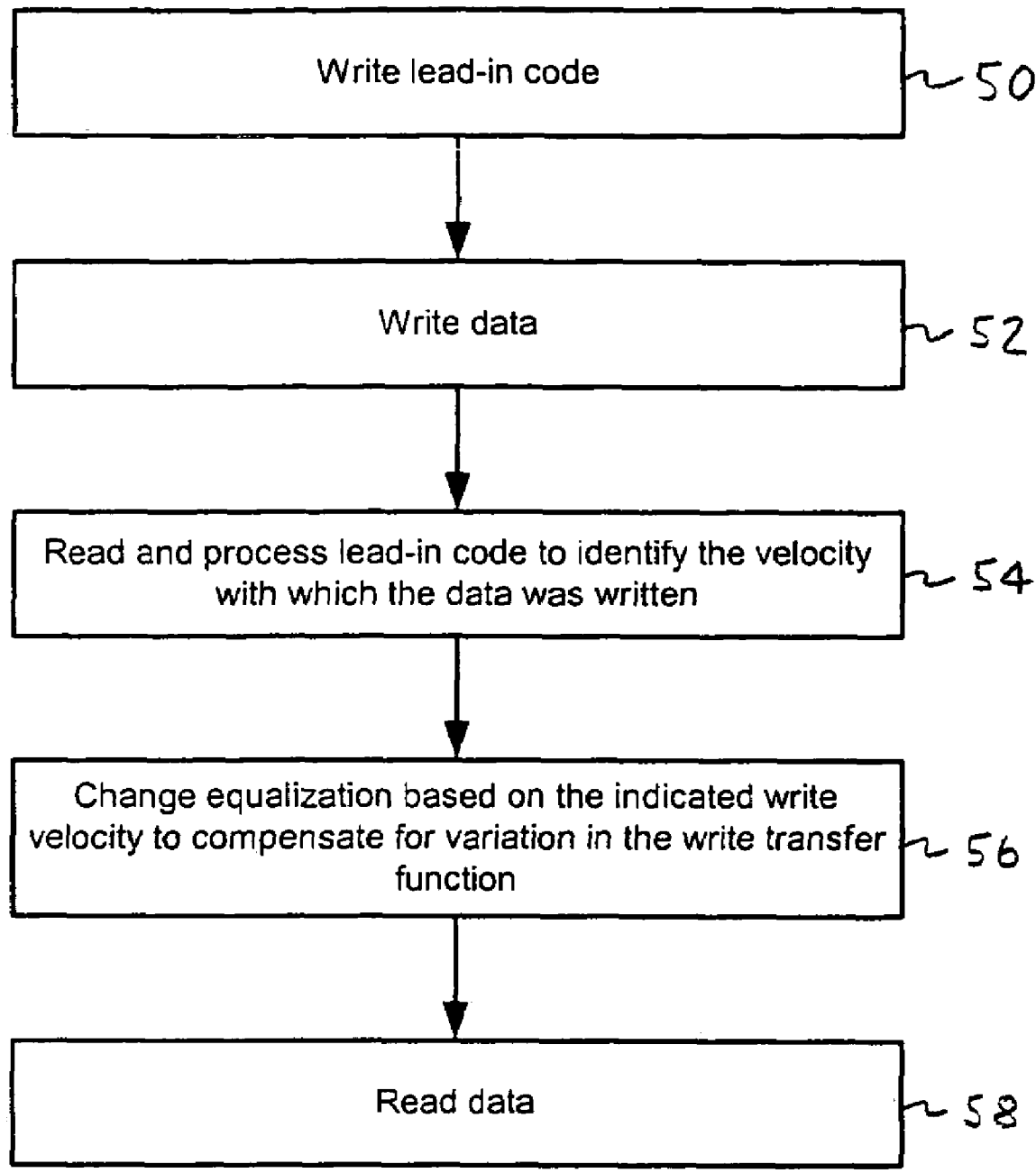
FIG. 3 illustrates a method of the invention.

FIG. 3 illustrates a method of identifying write velocity. When the write driver directs the tape head to write the track, a lead-in code is written prior to writing the track data. The lead-in code identifies a velocity with which the track data is about to be written. Writing the lead-in code is indicated at block 50. At block 52, the track data is written. When the track is being read, reading the track produces a data signal and a lead-in code of the data signal is processed prior to determining the data stream. The lead-in code identifies the velocity with which the track data was written. This is indicated at block 54.

After identification of the write velocity, the PRML equalization/detection channel is adjusted based on the identified velocity to compensate for write transfer function variation. This is indicated at block 56. At block 58, the data is read. It is appreciated that the lead-in code may be coded in any suitable way, but is coded in a way that is reasonably immune to write channel transfer function variation such that the lead-in code is comprehended prior to adjusting the equalization/detection channel.

Figure 4:
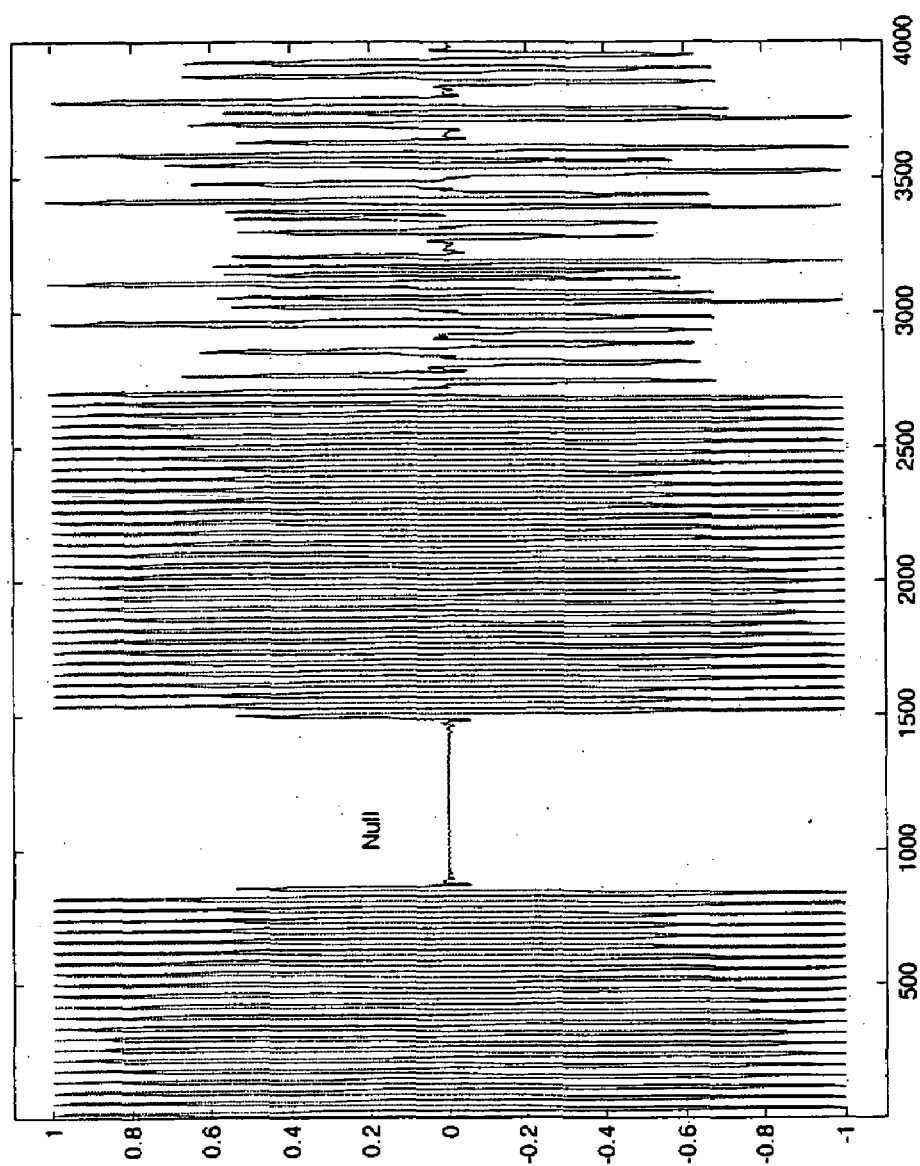
FIG. 4 illustrates an example of an embedded null signal within an amble sequence.

Partial response systems have a unique property in that there is a null at the highest transition frequency. That is, the data signal produced by reading a track is a null signal when the transition frequency on the track exceeds a predetermined threshold. This lack of signal makes the null a suitable signal for use within the lead-in code. This is because the null signal is very immune to variation in the write process over varying velocity because it is essentially an erased signal. Additionally, since the decoder can be designed to discriminate the null as a reset, the null signal can be used in a dual-purpose sequence. FIG. 4 illustrates a null embedded in an amble sequence.

Figure 5:
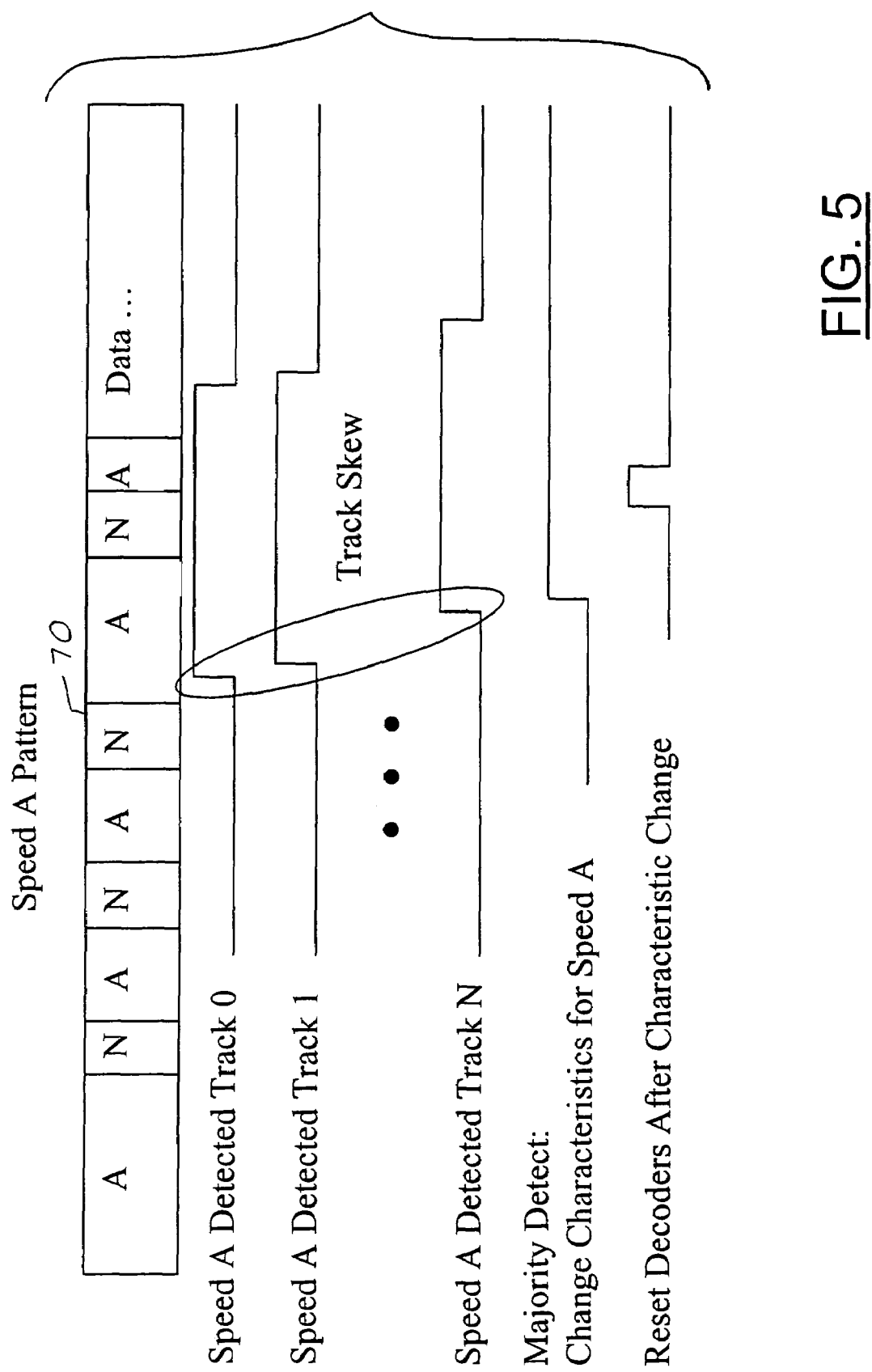
FIGS. 5–7 illustrate an exemplary arrangement where the tape has a plurality of tracks that are simultaneously read and a lead-in code of each data signal is processed with the write velocity (and characteristic write transfer function) being determined based on a consensus of lead-in code detection.
Figure 6:
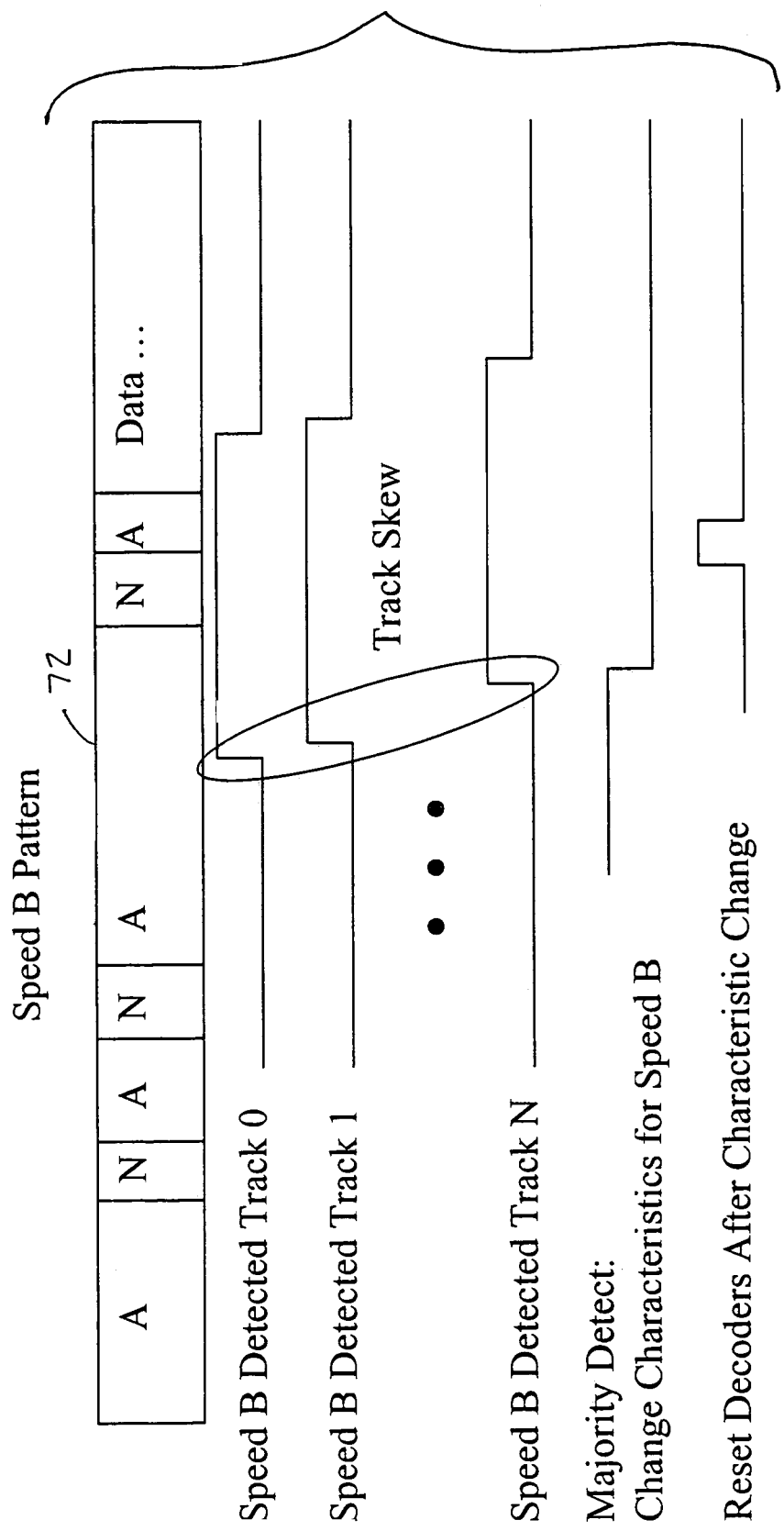
Figure 7:
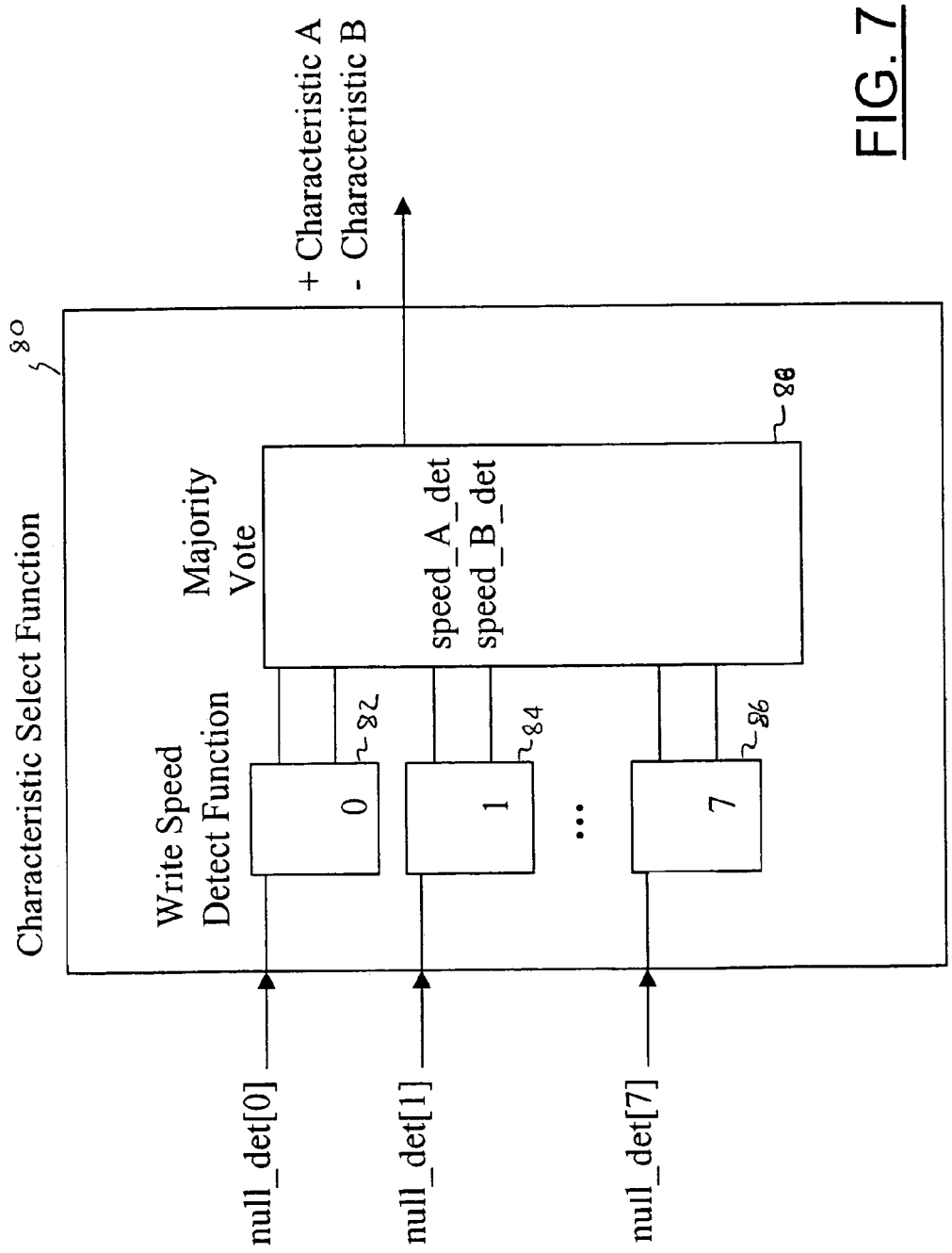

FIGS. 5–7 illustrate an exemplary implementation using an approach where the lead-in code is coded as an amble sequence using a null signal embedded therein to convey information. The illustrated example identifies the velocity with which the track data were written as either of two possible speeds (speed A and speed B). As best shown in FIG. 5, the speed A pattern includes several null signals embedded in an amble sequence. Null signal 70 is of particular interest and determines the amble sequence to be the speed A pattern.

FIG. 6 illustrates the speed B pattern as an amble sequence with embedded null signals. In the speed B pattern, amble signal 72 determines the amble sequence to be the speed B pattern. This may be observed by noting the difference between the speed A pattern and speed B pattern.

With continuing reference to FIGS. 5 and 6, the lead-in code (amble sequence with embedded null signals) is detected for each track on the tape. For each detection, a determination is made as to which speed pattern is presented. The write velocity is determined based on a consensus of the determinations. FIG. 5 shows the lead-in code for each track being determined as speed A. The majority consensus is speed A and characteristic A is selected. FIG. 6 shows a speed B example.

FIG. 7 illustrates a characteristic select function 80. Characteristic select function 80 is implemented within PRML processing circuitry 30 (FIG. 2) to select the characteristic for PRML equalization and detection channels 34 (FIG. 2). That is, the lead-in codes are read to determine the write velocity (as speed A or speed B) and the appropriate characteristic is determined. In this way, the equalization/detection channels are adjusted according to the determined characteristic to compensate for write channel transfer function variation.

With continuing reference to FIG. 7, characteristic select function 80 detects the embedded nulls in the amble sequences from the various tracks. For each track, a write speed detect function 82, 84, 86 identifies the write velocity from a group of potential write velocities. Majority vote functional block 88 identifies the write velocity based on a consensus of the detect functions. Block 88 has an output that indicates either characteristic A or characteristic B which is used to configure the equalization/detection channels to compensate for write channel transfer function variation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A drive of the type in which, during writing, a transport velocity is matched to a composite transfer rate of a host computer and wherein a write channel transfer function varies as a result, the drive comprising:

a housing for receiving a medium having at least one track;

a head for reading and writing the at least one track of the medium, wherein reading the at least one track produces a data signal;

a processing circuit including a channel for processing the data signal to determine the data stream for the data signal; and wherein the processing circuit is configured to, when the track or tracks are being read, process the data signal prior to determining the data stream to identify a velocity with which the track or tracks of data were written, the processing circuit being further configured to adjust the channel based on the identified velocity to compensate for write channel transfer function variation.

2. The drive of claim 1 wherein the processing circuit further includes a write driver for directing the head to write the track, wherein the write driver is configured to write a lead-in code prior to writing the track data, the lead-in code identifying a velocity with which the track data are about to be written.

3. The drive of claim 2 wherein the data signal produced by reading the track is a null signal when the transition frequency on the track exceeds a predetermined threshold.

4. The drive of claim 3 wherein the lead-in code is coded as an amble sequence including at least one null signal embedded therein.

5. The drive of claim 4 wherein the received medium has a plurality of parallel tracks that are simultaneously read to produce a plurality of data signals, and wherein the processing circuit is configured to process a lead-in code of each data signal and identify the velocity at with which the parallel tracks were written.

6. The drive of claim 5 wherein the write velocity is determined based on a consensus of the lead-in codes.

7. The drive of claim 1 wherein the write velocity is identified as a write velocity selected from a group of write velocities.

8. The drive of claim 1 wherein the drive is a tape drive and the medium is a magnetic tape.

9. The drive of claim 1 wherein the channel is a partial response maximum likelihood (PRML) equalization/detection channel.

10. A method of identifying write velocity during reading in a drive of the type in which, during writing, a transport velocity is matched to a composite transfer rate of a host computer and wherein a write channel transfer function varies as a result, the drive including a housing for receiving a medium having at least one track, a head for reading and writing the at least one track of the medium, wherein reading the at least one track produces a data signal, and a processing circuit including a channel for processing the data signal to determine the data stream for the data signal, the method comprising:

when the track or tracks are being read, processing the data signal prior to determining the data stream to identify a velocity with which the track or tracks of data were written; and adjusting the channel based on the identified velocity to compensate for write channel transfer function variation.

11. The method of claim 10 wherein the processing circuit further includes a write driver for directing the head to write the track, the method further comprising:

writing a lead-in code prior to writing the track data, the lead-in code identifying a velocity with which the track data are about to be written.

12. The method of claim 11 wherein the data signal produced by reading the track is a null signal when the transition frequency on the track exceeds a predetermined threshold.

13. The method of claim 12 wherein the lead-in code is coded as an amble sequence including at least one null signal embedded therein.

14. The method of claim 13 wherein the received medium has a plurality of parallel tracks that are simultaneously read to produce a plurality of data signals, and wherein the method further comprises:

processing a lead-in code of each data signal and identifying the velocity at with which the parallel tracks were written.

15. The method of claim 14 wherein the write velocity is determined based on a consensus of the lead-in codes.

16. The method of claim 10 wherein the write velocity is identified as a write velocity selected from a group of write velocities.

17. The method of claim 10 wherein the drive is a tape drive and the medium is a magnetic tape.

18. The method of claim 10 wherein the channel is a partial response maximum likelihood (PRML) equalization/detection channel.

* * * * *